United States Patent
Hayama et al.

(10) Patent No.: US 8,701,824 B2
(45) Date of Patent: Apr. 22, 2014

(54) MUFFLER FOR SMALL-SIZED VEHICLE

(75) Inventors: Yoshitaka Hayama, Wako (JP);
Kenichiro Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/594,909

(22) Filed: Aug. 27, 2012

(65) Prior Publication Data

US 2013/0075192 A1    Mar. 28, 2013

(30) Foreign Application Priority Data

Sep. 28, 2011    (JP) .................. 2011-213186

(51) Int. Cl.
*F01N 13/02*    (2010.01)
*F01N 3/10*    (2006.01)

(52) U.S. Cl.
USPC ........... 181/228; 181/249; 181/255; 181/258; 181/269

(58) Field of Classification Search
USPC .......... 181/227, 228, 249, 255, 258, 269, 282
See application file for complete search history.

(56) References Cited

U.S. PATENT DOCUMENTS

| 5,392,602 A * | 2/1995 | Matsumoto .............. 60/299 |
| 5,907,135 A * | 5/1999 | Hayakawa et al. .......... 181/282 |
| 7,374,016 B2 * | 5/2008 | Yamaguchi et al. ......... 181/249 |
| 2007/0261907 A1 * | 11/2007 | Nishimura et al. .......... 180/296 |
| 2009/0120716 A1 * | 5/2009 | Yamamoto et al. .......... 181/205 |

FOREIGN PATENT DOCUMENTS

JP    2005-240720 A    9/2005

* cited by examiner

*Primary Examiner* — Jeremy Luks
(74) *Attorney, Agent, or Firm* — Squire Sanders (US) LLP

(57) ABSTRACT

The inside of a muffler main body formed from an outer plate into the shape of a cylinder is divided into an upstream-side expansion chamber and downstream-side expansion chambers by partition walls. A catalyst is contained in the upstream-side expansion chamber having a larger volume, and a cylinder-shaped reinforcement member is attached to an inner surface of the outer plate of the upstream-side expansion chamber.

21 Claims, 7 Drawing Sheets

MUFFLER FOR SMALL-SIZED VEHICLE

BACKGROUND

1. Field

The present invention relates to a muffler for a small-sized vehicle, in which the muffler is connected to an exhaust system of an engine of a small-sized vehicle such as a motorcycle, a catalyst is contained in the muffler, and a reduction in exhaust resistance and a decrease in exhaust noise are achieved at the same time.

2. Description of Related Art

A conventional muffler has been known in which the inside of a cylinder-shaped case of the muffler is divided into multiple expansion chambers by partition walls, and a catalyst is contained in a particular one of the expansion chambers (see Patent Document 1, Japanese Patent Application Publication No. 2005-240720).

In such a muffler, by enlarging the volume of the expansion chamber containing the catalyst this expansion chamber is expected to make the exhaust pressure lower at the downstream of the catalyst, to reduce the exhaust resistance, to make the flow of the exhaust gas better, to enhance the engine performance, and in addition, to reduce the exhaust noise. However, the enlargement of the volume of the expansion chamber containing the catalyst poses a problem that an outer plate of the muffler, which surrounds the expansion chamber, vibrates due to its reception of the noise of the exhaust gas and noise of reaction of the catalyst, and accordingly causes noise.

SUMMARY

The present invention has been made with the foregoing situation taken into consideration. An object of the present invention is to provide a novel muffler for a small-sized vehicle which is capable of solving the foregoing problems by providing reinforcement to the outer plate surrounding the expansion chamber in which the catalyst is contained, and thereby achieving enhancement of an engine performance by a reduction in the exhaust resistance and achieving a decrease in the exhaust noise at the same time.

In one embodiment, the invention provides a muffler for a small-sized vehicle which is connected to an exhaust pipe connected to an engine, and which includes a catalyst inside. A muffler main body is formed from an outer plate into the shape of a cylinder. An inside of the muffler main body is divided into a plurality of expansion chambers, which communicate with each other, by partition walls which are attached to an inner peripheral surface of the outer plate. The catalyst is contained in the upstream-side expansion chamber to which an rear end of the exhaust pipe is connected. An exhaust gas discharging port is provided at a downstream end of the downstream-side expansion chamber. A cylinder-shaped reinforcement member, which is independent of the partition walls, is attached to the inner peripheral surface of the outer plate inside the upstream-side expansion chamber.

In another embodiment, a volume of the upstream-side expansion chamber containing the catalyst is formed larger than a volume of each of a plurality of the downstream-side expansion chambers.

In another embodiment, a plane of projection of an outlet of the catalyst in an axial direction intersects a line parallel to a center axis line of the muffler main body. The outlet of the catalyst is directed to a join portion where the first partition wall defining the upstream-side expansion chamber containing the catalyst and the outer plate are joined together.

In another embodiment, the outlet of the catalyst is directed upward. A face-to-face weld portion of the cylinder reinforcement member is provided at a side portion of the muffler main body in a left-right direction.

In another embodiment, a plurality of through-holes are opened in the cylinder-shaped outer plate of the muffler main body corresponding to positions to attach the cylinder-shaped reinforcement member. The through-holes are occluded by the cylinder-shaped reinforcement member.

In another embodiment, the cylinder-shaped reinforcement member is formed from the same stainless steel plate as the outer plate of the muffler main body. A plate thickness of the cylinder-shaped reinforcement member is formed thicker than a plate thickness of the outer plate of the muffler main body.

In another embodiment, the through-holes in the muffler main body are formed in the same size as a size of weld holes which are opened in the outer plate of the muffler main body corresponding to the partition walls.

In certain embodiments, therefore, the volume of the upstream-side expansion chamber, with which the outlet of the catalyst communicates, can be formed larger than the volumes of the downstream-side expansion chambers. Thereby, it is possible to make the pressure lower at the downstream of the catalyst, to make the flow of the exhaust gas better inside the catalyst, to reduce the exhaust resistance, and to enhance the engine performance. In addition, the cylinder-shaped reinforcement member, which is independent of the partition walls, is attached to the inner peripheral surface of the outer plate inside the upstream-side expansion chamber. For these reasons, it is possible to prevent noise which would otherwise occur due to "resonance" of the outer plate of the muffler main body surrounding the enlarged upstream-side expansion chamber.

In other embodiments, the plate thickness of the outer plate of the muffler main body, which corresponds to the upstream-side expansion chamber having the larger volume with the catalyst contained therein, is made equal to the plate thickness of the outer plate of the muffler main body, which corresponds to the downstream-side expansion chambers each having a smaller volume. At the same time, it is possible to prevent the "resonance" of the outer plate which corresponds to the upstream-side expansion chamber having the larger volume. This makes it possible to prevent the muffler as a whole from being constructed in a larger size.

In addition to the enlargement of the volume of the upstream-side expansion chamber in which the catalyst is contained, in certain embodiments, a long distance from the outlet of the catalyst to the partition wall for partitioning the expansion chamber is secured. Thus, it is possible to reduce the pressure of the exhaust gas and to decrease the exhaust resistance further. Concurrently, it is possible to prevent noise which would otherwise occur due to the "resonance" of the outer plate.

In other embodiments, the outlet of the catalyst is directed upward, and the face-to-face weld portion of the cylinder-shaped reinforcement member is provided in the side portion of the muffler main body in the left-right direction. These make the cylinder-shaped reinforcement member less susceptible to the influence of the exhaust heat of the high-temperature exhaust gas which is discharged from the catalyst. Accordingly, it is possible to use the cylinder-shaped reinforcement member which is less expensive.

In other embodiments, the cylinder-shaped reinforcement member and the through-holes, which are opened in the outer plate, can be firmly joined together by the welds with high adhesion like the plug welds. This makes it easy to weld the cylinder-shaped reinforcement member and the outer plate together with high bond strength.

In other embodiments, the cylinder-shaped reinforcement member's effect of reinforcing the outer plate of the muffler main body is enhanced. Furthermore, the specific heat of the cylinder-shaped reinforcement member is made higher and the welding time is accordingly secured. Thereby, the outer plate is welded sufficiently. These make it possible to enhance the weldability and the productivity.

In some embodiments, the same welding machine and the same welding conditions can be uniformed. Thus, it is possible to enhance the productivity.

DETAILED DESCRIPTION

An embodiment of the present invention will specifically be described below on the basis of the accompanying drawings.

Front, rear, left, right, upper, and lower remarks in the descriptions of the following embodiment are based on a traveling direction of a motorcycle on which an exhaust system Ex is mounted.

This embodiment represents a case where a muffler for a smaller-sized vehicle of the present invention is carried out as the exhaust system Ex mounted on the motorcycle.

Figure 1:
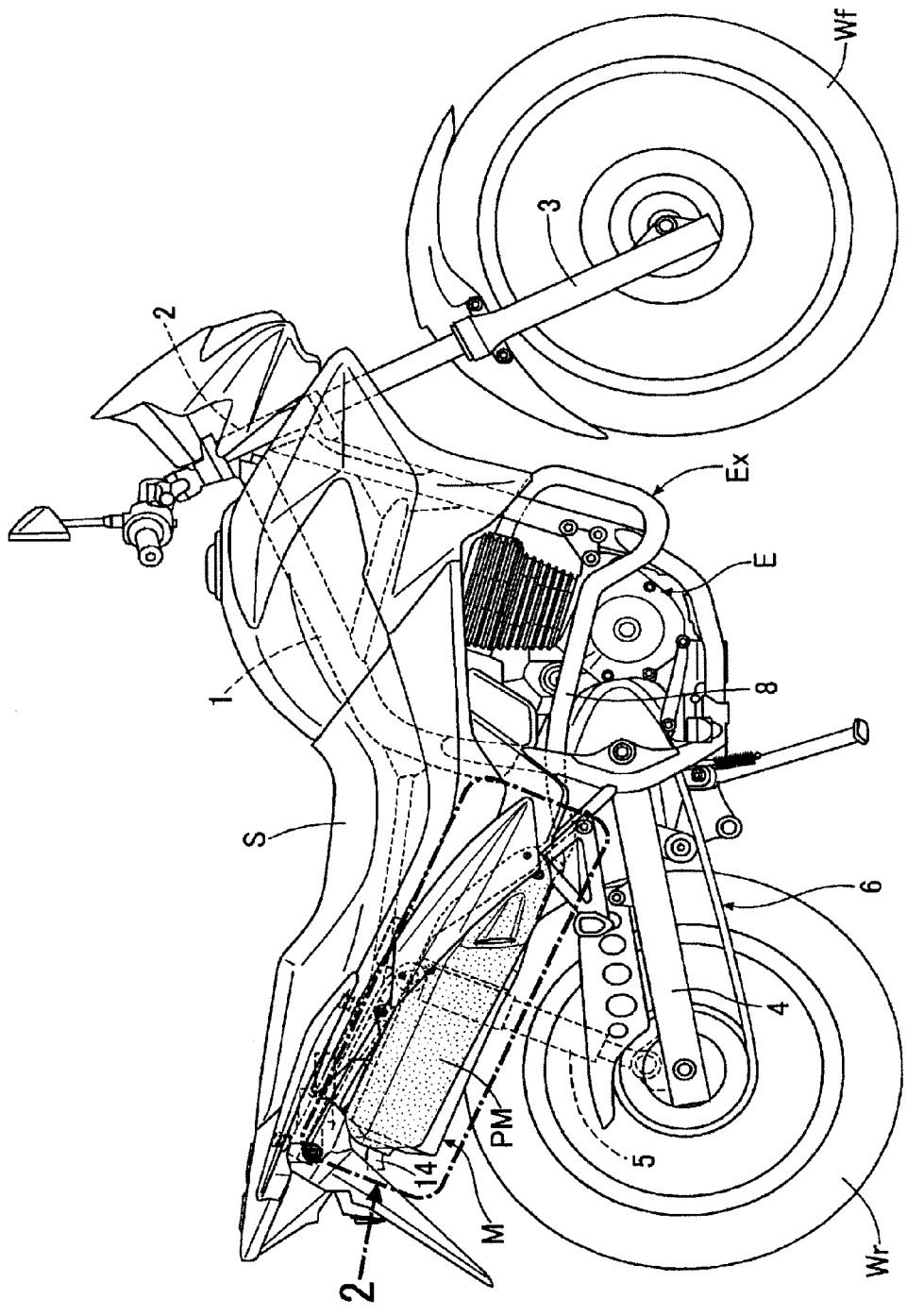
FIG. 1 is a side view of a motorcycle having a muffler according to an example of the present invention.

FIG. 1 shows a saddle riding-type motorcycle which includes the muffler for a small-sized vehicle of the present invention. A head pipe 2 is provided at a front-end portion of a vehicle body frame 1 formed from pipe members and the like. A front wheel Wf is suspended on front forks 3 which are steerably supported by this head pipe 2. A swingarm 4, on which a rear wheel Wr is suspended, is mounted on a pivot in the rear portion of the vehicle body frame 1 in a vertically swingable manner. This swingarm 4 is supported by the vehicle body frame 1 with the assistance of rear cushion units 5. A driving engine E is mounted in a center lower portion of the vehicle body frame 1. An output shaft of this engine E is connected to the rear wheel Wr via a power transmission mechanism 6. In addition, a saddle riding-type seat S for a rider is provided on an upper part of the vehicle body frame 1 above the rear wheel Wr.

The exhaust system Ex configured to discharge an exhaust gas, which is discharged by the operation of this engine E, to the outside is connected to an exhaust port of the driving engine E. This exhaust system Ex includes an exhaust pipe 8 which extends under the seat S toward the rear of the vehicle body frame. A muffler M for a small-sized vehicle of the present invention, which is obliquely extended to the rear upward from front to back under the seat S, is connected to a downstream end of this exhaust pipe 8.

Thus, the exhaust gas which is discharged from the engine E by the operation thereof enters the muffler M via the exhaust pipe 8. While the exhaust gas passes through a catalyst CA in the muffler M, harmful substances such as HC, CO and NOx are removed. Thereafter, the resultant exhaust gas enters an expansion chamber or silencing chamber, and is thereby silenced and eventually discharged to the atmosphere.

Next, descriptions will be provided for the specific structure of the muffler M containing the catalyst CA, by referring to FIGS. 2 to 7.

This muffler M inclines upward in its longitudinal direction, that is to say, from the upstream to downstream sides in a direction in which the exhaust gas flows (i.e., inclines upward from front to back). The muffler M is supported by the vehicle body frame 1 with the assistance of a muffler stay 26.

A muffler main body 10, which constitutes an outer shell of the muffler M, is hermetically formed by using a trunk section 11 prepared by rolling up an outer plate 12 made of a stainless steel plate into the shape of a cylinder and joining free ends of the outer plate 12 together by a face-to-face weld 15, and an end plate 13 occluding a rear end (downstream end) of the trunk section 11. A front portion of the trunk section 11 is shaped like a truncated cone, which is tapered toward its front end (upstream end). A rear end (downstream end) of the exhaust pipe 8 is connected to the front end (upstream end) of the trunk section 11. A tail pipe 14 serving as an exhaust gas discharging port, which is open toward the outside, is connected to the end plate 13.

An intermediate portion inside the muffler main body 10, which extends in the front-rear direction, is portioned into an upstream-side expansion chamber 17 and a downstream-side expansion chamber 18 by a first partition wall 19 which is hermetically welded (to be described later) to an inner peripheral surface of the outer plate 12 of the muffler main body 10. Furthermore, an intermediate portion of the downstream-side expansion chamber 18, which extends in the front-rear direction, is partitioned in the front-rear direction by a second partition wall 20 which is similarly hermetically welded (to be described later) to the inner peripheral surface of the outer plate 12, and is thereby divided into a front downstream-side expansion chamber 18$f$ and a rear downstream-side expansion chamber 18$r$.

Figure 6:
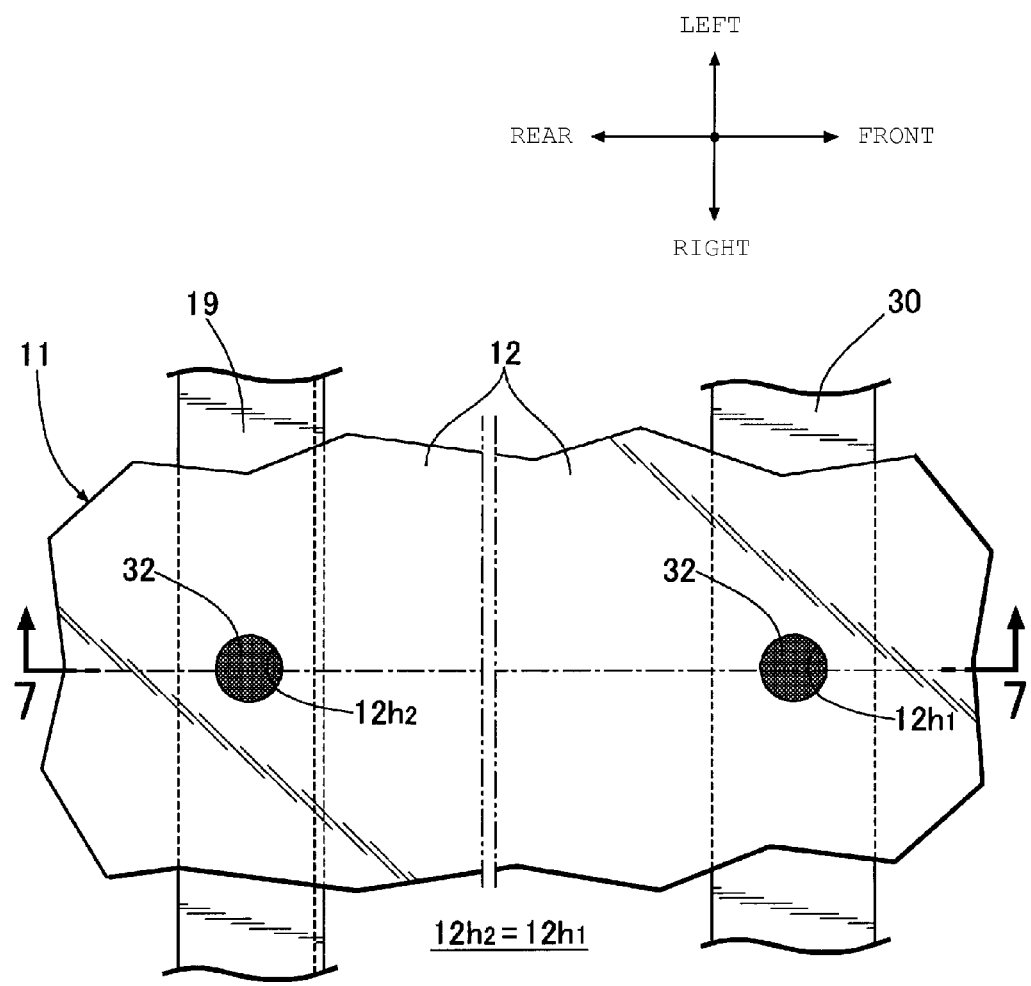
FIG. 6 is a magnified cross-sectional view of the part taken along the line 6-6 of FIG. 2.

As shown in FIG. 6, multiple weld holes 12$h_2$ are opened in positions on the outer plate 12 of the muffler main body 10, which correspond to join portions to join the first and second partition walls 19, 20 in such a manner as to be phase-shifted from the face-to-face weld portion of the outer plate and arranged at intervals in the circumferential direction (FIG. 6 shows the weld holes 12$h_2$ in the outer plate 12 corresponding to the first partition wall 19). Outer peripheral surfaces of the first and second partitions 19, 20 are joined to the inner peripheral surface of the outer plate 12 via these weld holes 12$h_2$ in the form of plug welds 32. Thereby, the first and second partition walls 19, 20 are firmly joined to the outer plate 12.

The upstream-side expansion chamber 17 is formed having a larger volume than those of the front downstream-side expansion chamber 18$f$ and the rear downstream-side expansion chamber 18$r$. The catalyst CA is contained in the upstream-side expansion chamber 17.

This catalyst CA can be shaped like a cylinder. A front end (upstream end) of the catalyst CA penetrates and gets supported by a front end of the muffler main body 10, and is connected to the exhaust pipe 8. In addition, a rear end of the catalyst CA penetrates and gets supported by a support plate 16 which is provided at a front portion in the muffler main body 10. Furthermore, the rear end (downstream end) of the catalyst CA is open to the inside of the upstream-side expansion chamber 17. Thereby, the exhaust gas cleaned by the catalyst CA is allowed to flow into the upstream-side expansion chamber 17.

Figure 2:
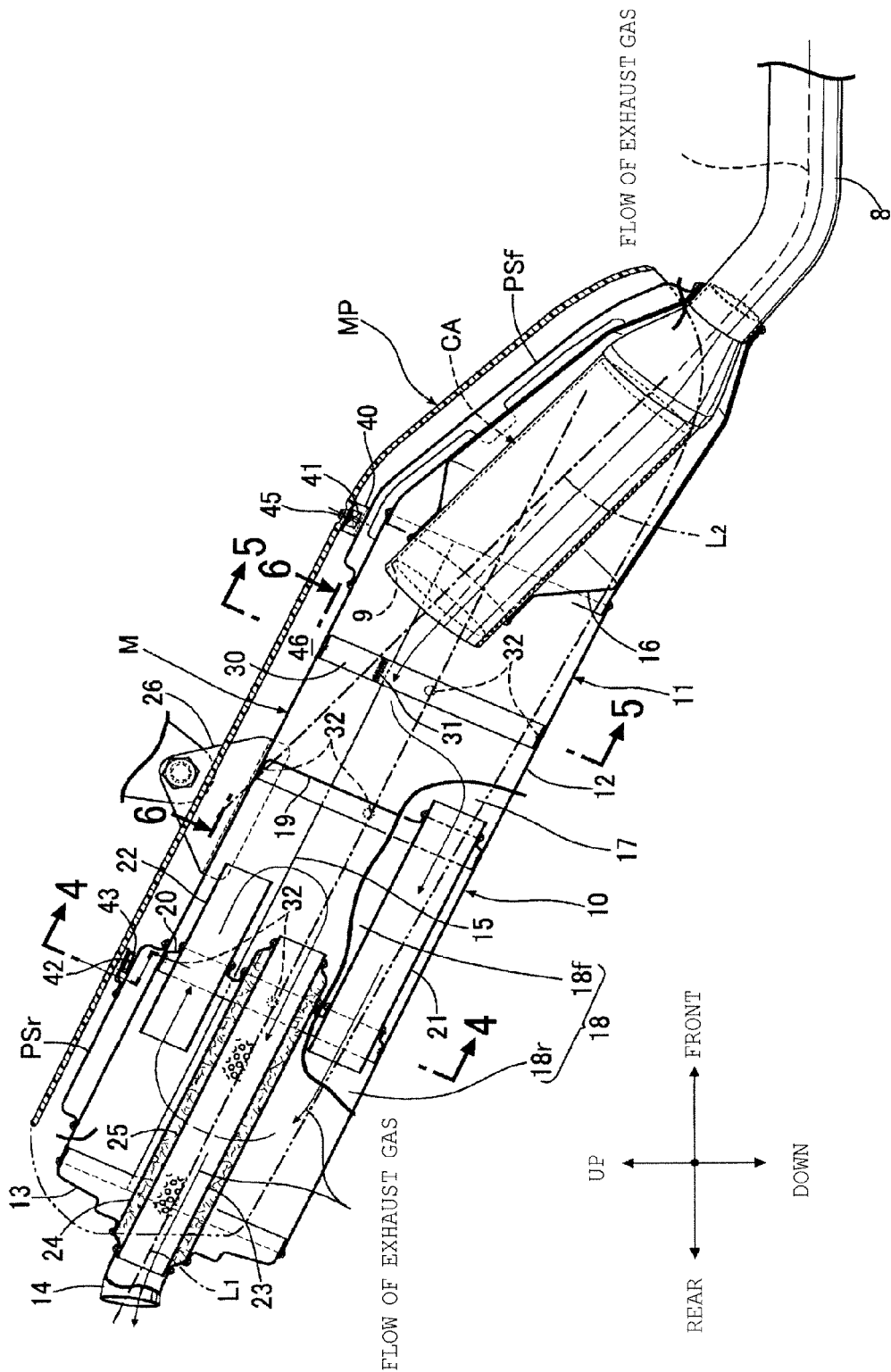
FIG. 2 is a magnified view of a part which is surrounded by an imaginary line and viewed in the direction of Arrow 2 of FIG. 1.
Figure 3:
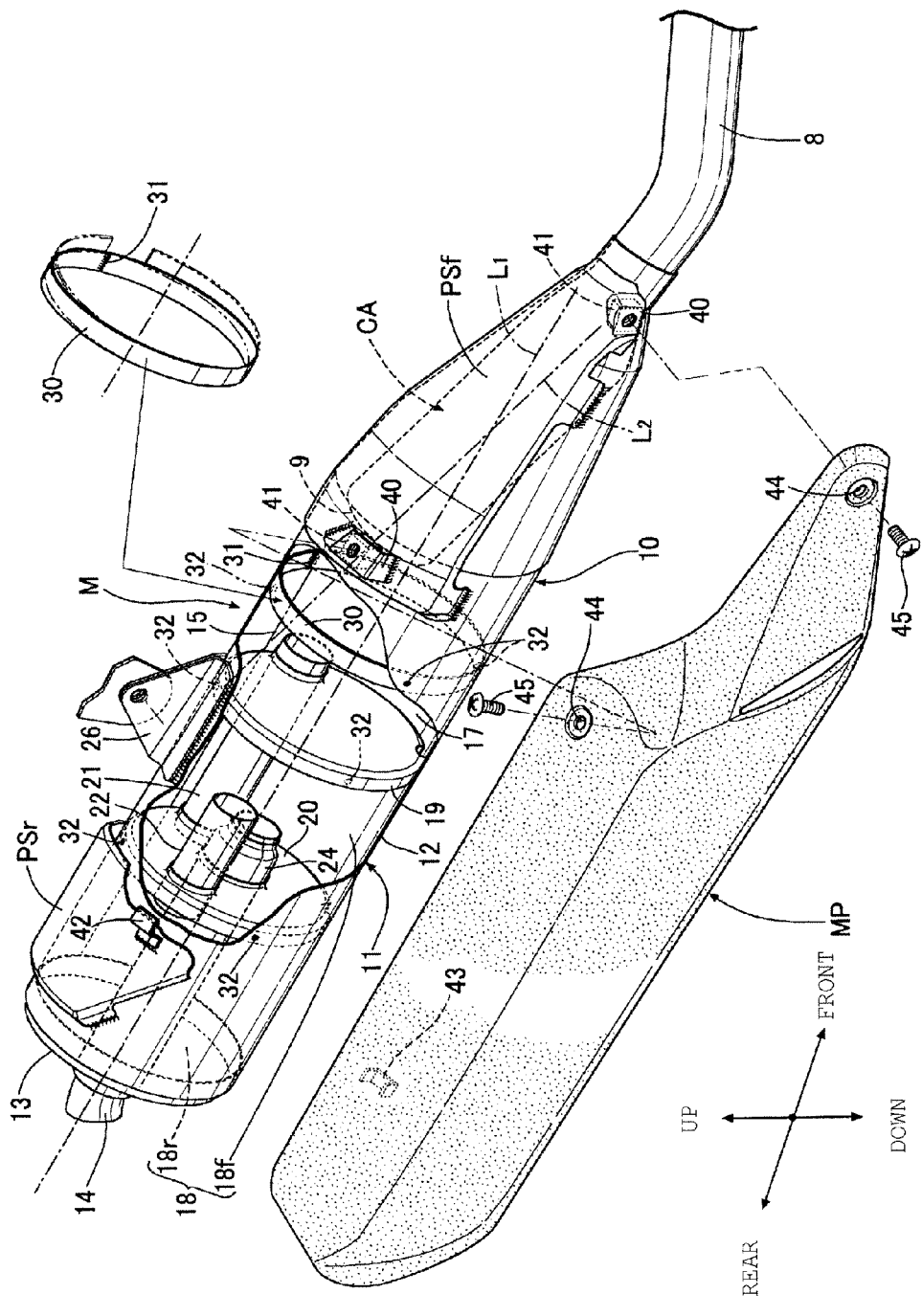
FIG. 3 is an exploded perspective view of the muffler according to an example of the present invention.
Figure 4:
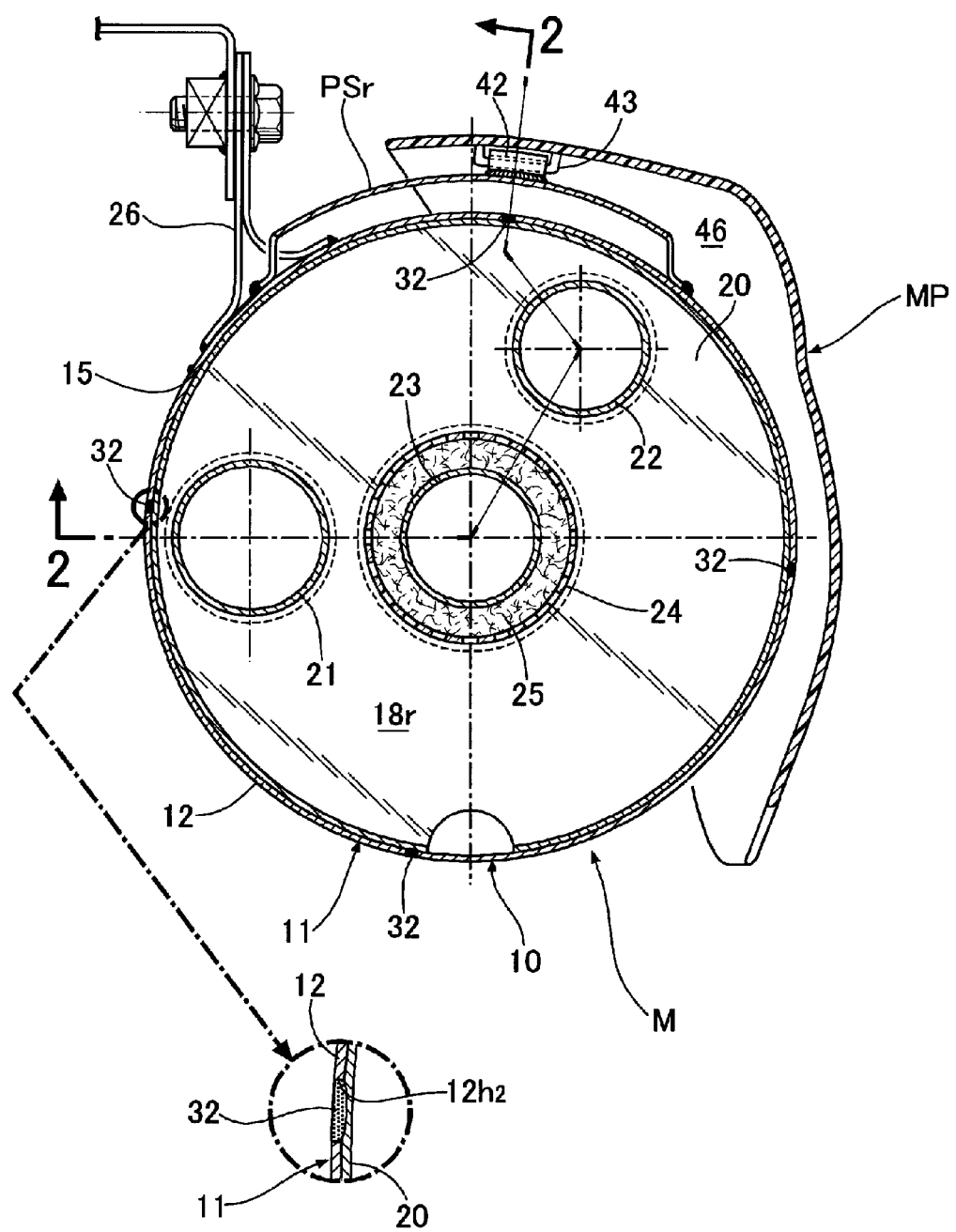
FIG. 4 is a magnified cross-sectional view of the part taken along the line 4-4 of FIG. 2.

As shown in FIGS. 2 and 3, the catalyst CA shaped like the cylinder is obliquely placed upward from front to back inside the muffler main body 10, or namely, upward from the front portion (upstream portion) to rear portion (downstream portion) thereof. A center axis line $L_2$ of the catalyst CA intersects a center axis line $L_1$ of the muffler main body. The plane of the projection of an outlet 9 of the catalyst CA in the axial direction intersects a line parallel to the center axis line $L_1$ of the muffler main body. The outlet 9 is directed upward toward the join portion between the outer plate 12 of the muffler main body 10 and the first partition wall 19. This makes it possible to secure a long distance from the outlet 9 of the catalyst CA to the outer plate 12 in the upstream-side expansion chamber 17.

A communication pipe 21 is supported by the first and second partition walls 19, 20. This communication pipe makes the upstream-side expansion chamber 17 and the rear downstream-side expansion chamber 18r communicate with each other. In addition, a different communication pipe 22 is supported by the second partition wall 20. This different communication pipe 22 makes the front downstream-side expansion chamber 18f and the rear downstream-side expansion chamber 18r communicate with each other. Thereby, the upstream-side expansion chamber 17, the front downstream-side expansion chamber 18f, and the rear downstream-side expansion chamber 18r inside the muffler main body 10 jointly function as a virtually unitary expansion chamber (silencing chamber). Moreover, an outlet pipe 23 penetrates and gets supported by the second partition wall 20 and the end plate 13. This outlet pipe 23 makes the front downstream-side expansion chamber 18r and the tail pipe 14 communicate with each other. The exhaust gas silenced in the expansion chambers 17, 18r, and 18f, is discharged to the outside via the tail pipe 14.

A noise-absorbing material holding plate 24, in which punch holes are punched, is provided on an outer peripheral surface of the outlet pipe 23. A noise-absorbing material 25 such as glass wool is filled in the interstice between the outer surface of the outlet pipe 23 and noise-absorbing material holding plate 24.

The muffler stay 26 is fixed to an upper surface of an intermediate portion of the trunk section 11 in the longitudinal direction. The muffler M is supported by the vehicle body frame 1 with the assistance of this muffler stay 26.

The volume of the upstream-side expansion chamber 17, in which the catalyst CA is contained, is larger than the volumes of the front and rear downstream-side expansion chambers 18f, 18r. The upstream-side expansion chamber 17 is reinforced with a cylinder-shaped reinforcement member 30. This cylinder-shaped reinforcement member 30 is prepared by rolling up a band-shaped plate member made of a stainless steel plate into the shape of a ring, and joining free ends thereof together by a face-to-face weld 31.

Figure 5:
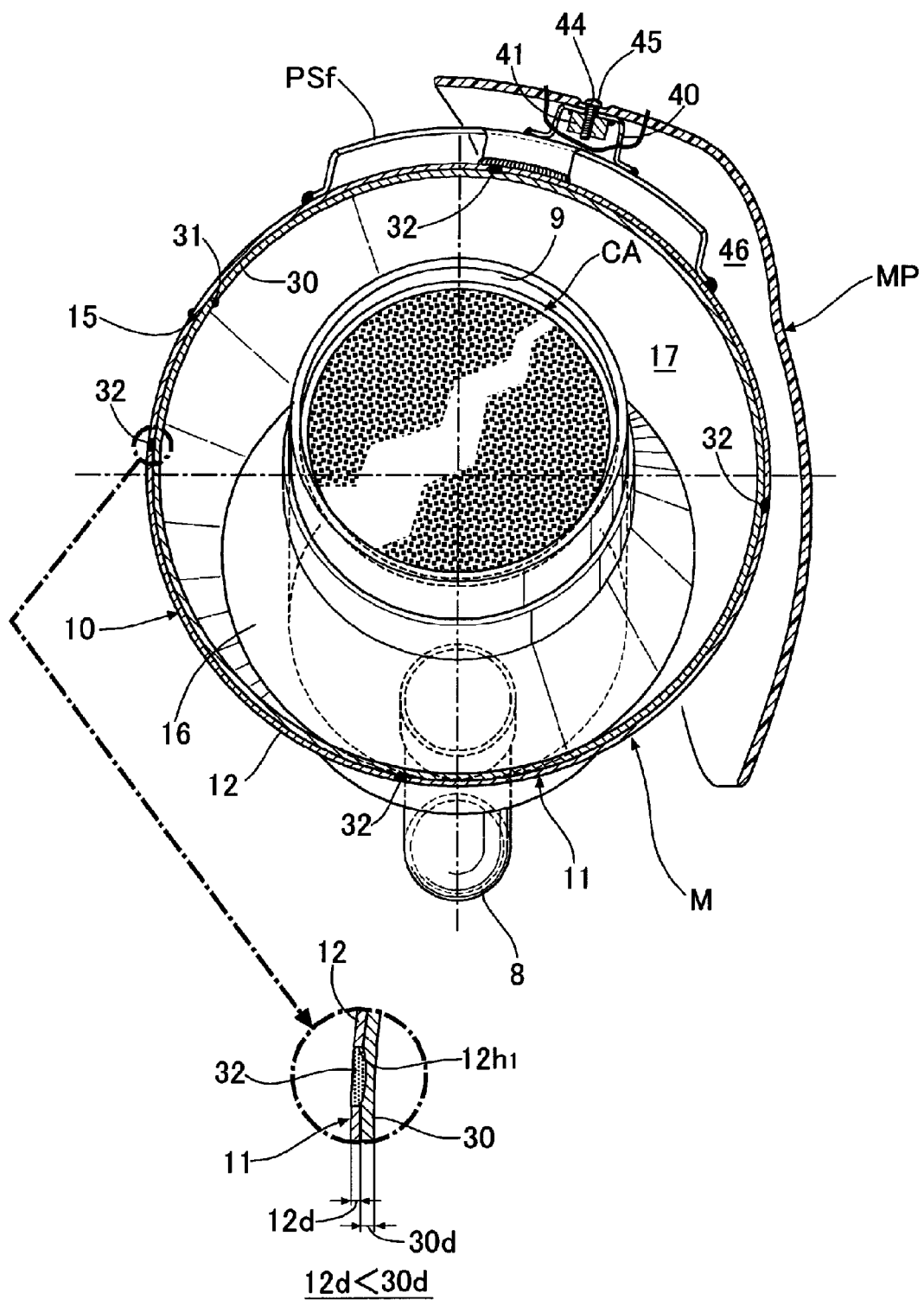
FIG. 5 is a cross-sectional view of the part taken along the line 5-5 of FIG. 2.
Figure 7:
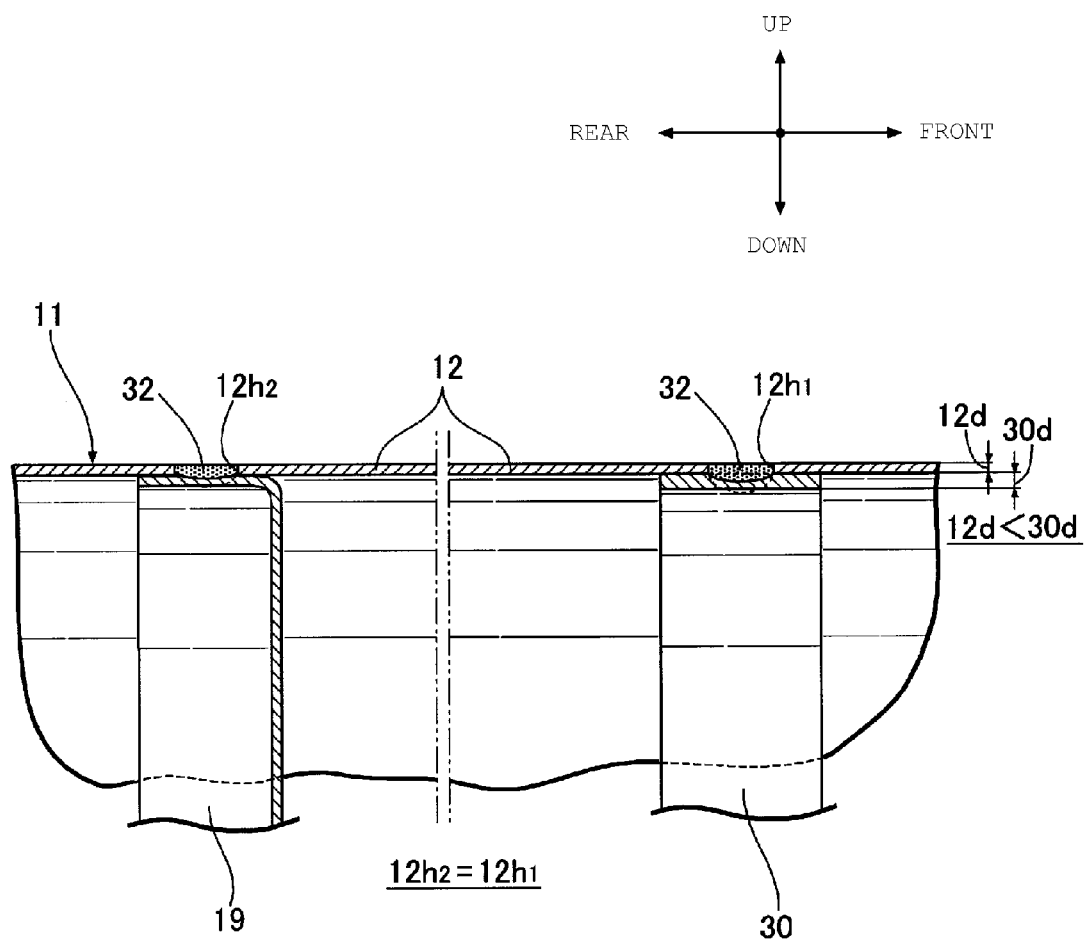
FIG. 7 is a cross-sectional view of the part taken along the line 7-7 of FIG. 6.

A plate thickness 30d of the cylinder-shaped reinforcement member 30 is formed thicker than a plate thickness 12d of the outer plate 12, which is made of the stainless steel plate and constitutes the trunk section 11 of the muffler main body 10 (see FIGS. 5 and 7).

In the upstream-side expansion chamber 17, the cylinder-shaped reinforcement member 30, which is shaped like a ring, is joined to the inner peripheral surface of the outer plate 12 of the muffler main body 10 by other plug welds 32, at the downstream of the upwardly-directed outlet 9 of the catalyst CA. In this case, the face-to-face weld 31 portion of the cylinder-shaped reinforcement member 30 is located at a side portion of the muffler main body 10 in the left-right direction. This location makes the face-to-face weld 31 less susceptible to the influence of the exhaust gas which is discharged from the upwardly-directed outlet 9 of the catalyst CA.

The cylinder-shaped reinforcement member 30 reinforces the upstream-side expansion chamber 17 having the larger volume. As described later, the cylinder-shaped reinforcement member 30 is designed to prevent noise which would otherwise occur due to "resonance" of the outer plate 12 of the muffler main body 10, which corresponds to this upstream-side expansion chamber 17, while the exhaust gas is flowing through the inside of the muffler M.

Next, descriptions will be provided for the procedure for joining the cylinder-shaped reinforcement member 30 to the outer plate 12 of the muffler main body 10.

As shown in FIGS. 5 and 6, inside the upstream-side expansion chamber 17 of the muffler main body 10, multiple (four) welding through-holes $12h_1$ are opened in the outer plate 12 corresponding to the cylinder-shaped reinforcement member 30 at intervals in the circumferential direction. The cylinder-shaped reinforcement member 30, which is shaped like the ring, is set to a conventional publicly-known jig (not illustrated) in advance. The outer plate 12 of the muffler main body 10 is wound around the outside of the cylinder-shaped reinforcement member 30. Thereafter, the face-to-face surfaces of the outer plate 12 are joined together by the weld 15. The cylinder-shaped reinforcement member 30 is made to correspond to a weld position on the outer plate 12 by circumferentially phase-shifting the cylinder-shaped reinforcement member 30 with respect to the weld 15 on the outer plate 12. Thereafter, the cylinder-shaped reinforcement member 30 is joined to the inner peripheral surface of the outer plate 12 by plug welds 32 via the respective multiple through-holes $12h_1$ in the outer plate 12 (see FIG. 6). Thereby, the cylinder-shaped reinforcement member 30 is firmly joined to the inner peripheral surface of the outer plate 12.

The through-holes $12h_1$ are formed in the same size as that of the weld holes $12h_2$ for joining the first and second partition walls 19, 20 to the outer plate 12 of the muffler main body 10 by the plug welds 32 (see FIG. 6).

A front protector stay PSf is integrally attached to an upper surface of the front portion of the muffler main body 10. Meanwhile, a rear protector stay PSr is welded to an upper surface of the rear portion of the muffler main body 10 which corresponds to the rear downstream-side expansion chamber 18r.

A muffler protector MP, made from synthetic resin, for covering the upper surface of the muffler main body 10 is detachably attached to the front and rear protector stays PSf, PSr.

As shown in FIGS. 2, 3 and 5, attachment stays 40 provided with weld nuts 41 are welded to the outer surfaces of the front and rear portions of the front protector stay PSf, respectively. In addition, a lock reception piece 42 is welded to the upper surface of the front portion of the rear protector stay PSr. The muffler protector MP is fixed to the upper surface of the muffler main body 10 with the front and rear protector stays PSf, PSr in between by making an engagement piece 43, which is fixed to the rear portion of the inner surface of the muffler protector MP, engage with the lock reception piece 42, and fastening fastener screws 45 to the weld nuts 41 via attachment holes which are opened in the front and rear of the front portion of the muffler protector MP, respectively. Furthermore, a ventilation passage 46 through which the running wind can flow is formed between the upper surface of the trunk section 11 of the muffler main body 10 and the muffler protector MP. The muffler M can be air-cooled by the wind which passes through the ventilation passage 46. Moreover, the muffler protector MP prevents the transmission of the hot air from the muffler M to the seat S which is situated thereabove.

Next, descriptions will be provided for how this embodiment works.

The exhaust gas, which is produced due to the operation of the engine E, is guided to the muffler M via the exhaust pipe 8. Inside the muffler M, the high-temperature exhaust gas flows into the catalyst CA, where the harmful substances such as HC, CO, and NOx are removed. Thereafter, the resultant exhaust gas, which is heated to higher temperature, flows to the expansion chamber after passing through the catalyst CA. Inside the expansion chamber, as indicated with arrows in FIG. 2, the exhaust gas flows through the upstream-side expansion chamber 17, the communication pipe 21, the rear downstream-side expansion chamber 18r, the different communication pipe 22, and the front downstream-side expansion chamber 18f in this sequence. During this flow, the exhaust noise is silenced. Eventually, the resultant exhaust gas flows from the rear downstream-side expansion chamber 18f to the outlet pipe 23, and is discharged to the outside via the tail pipe 14.

The hot air emitted from the muffler M which is heated to higher temperature due to the exhaust heat of the exhaust gas and the heat of reaction of the catalyst CA in conjunction with the operation of the engine E can be discharged to the rear via the ventilation passage 46 between the muffler main body 10 and the muffler protector MP. Accordingly, a rise in the temperature of the muffler protector MP covering the outside of the muffler M can be curbed in the vicinity of the seat S for a rider, while the spread of the hot air to the outer side of the vehicle body can be curbed in the vicinity of the seat S.

In this embodiment, the volume of the upstream-side expansion chamber 17, with which the outlet 9 of the catalyst CA communicates, is formed larger than those of the front and rear downstream-side expansion chambers 18f, 18r. For this reason, the pressure of the exhaust gas is made lower at the downstream of the catalyst CA and thus the flow of the exhaust gas inside the catalyst CA is made better, thereby reducing the exhaust resistance, sometimes called back pressure. Accordingly, it is possible to enhance the performance of the engine E. In addition, because the cylinder-shaped reinforcement member 30, which is independent of the first partition wall 19, is attached to the inner peripheral surface of the outer plate 12 inside the upstream-side of the expansion chamber 17, it is possible to prevent noise which would otherwise occur due to the "resonance" of the outer plate 12 of the muffler main body 10 which covers the enlarged upstream-side expansion chamber 17.

The plate thickness of the outer plate 12 of the muffler main body 10, which corresponds to the upstream-side expansion chamber 17 having the larger volume with the catalyst CA contained therein, can be made equal to the plate thickness of the outer plate 12 of the muffler 10, which corresponds to the downstream-side expansion chambers 18f, 18r each having the smaller volume. While achieving this equality, it is possible to prevent the "resonance" of the outer plate which corresponds to the upstream-side expansion chamber 17 having the larger volume. This makes it possible to prevent the muffler M as a whole from being constructed in a larger size.

Furthermore, in addition to the enlargement of the volume of the upstream-side expansion chamber 17 in which the catalyst CA is contained, the long distance is secured from the outlet 9 of the catalyst CA to the first partition wall 19 partitioning the expansion chamber 17. For this reason, it is possible to reduce the pressure of the exhaust gas further. Thus, it is possible to further enhance the effect of reducing the exhaust resistance and the effect of preventing noise due to the "resonance" of the outer plate.

Moreover, the outlet 9 of the catalyst CA is directed upward, and the face-to-face weld 31 portion of the cylinder-shaped reinforcement member 30 is situated at the side portion of the muffler main body 10 in the left-right direction. These make the cylinder-shaped reinforcement member 30 less susceptible to the influence of the exhaust heat of the high-temperature exhaust gas which is discharged from the catalyst CA. Accordingly, it is possible to use the cylinder-shaped reinforcement member 30 which is less expensive.

Besides, the cylinder-shaped reinforcement member and the through-holes $12h_1$, which are opened in the outer plate 12, are firmly joined together by the plug welds 32 with high adhesion. This makes it easy to weld the cylinder-shaped reinforcement member 30 and the outer plate 12 together with high bond strength.

In addition, the cylinder-shaped reinforcement member 30 is made of the same stainless steel plate as the outer plate 12 of the muffler main body 10, and the plate thickness 30d thereof is formed thicker than the plate thickness 12d of the outer plate 12. For these reason, the effect of the cylinder-shaped reinforcement member 30 to reinforce the outer plate 12 of the muffler main body 10 is enhanced. Furthermore, the specific-heat of the cylinder-shaped reinforcement member 30 is made higher, and the welding time is accordingly secured. Thereby, the cylinder-shaped reinforcement member 30 and the outer plate are welded together sufficiently. These make it possible to enhance weldability and the productivity.

Moreover, the through holes $12h_1$ in the outer plate 12 of the muffler main body 10 are formed in the same size as that of the weld holes $12h_2$ which are opened in the outer plate 12 of the muffler main body 10 corresponding to the first and second partition walls 19, 20. For this reason, the same welding machine and the same welding conditions can be applied. Accordingly, it is possible to enhance the productivity.

Although the foregoing descriptions have been provided for the embodiment of the present invention, the present invention is not limited to the disclosed embodiments. The present invention can be carried out as various examples within the scope of the present invention.

For example, although the foregoing descriptions have been provided for the case where the muffler of the present invention is carried out for the saddle riding-type motorcycle, it is a matter of course that this can be also carried out for small-sized vehicles, such as other types of motorcycles and three-wheeled motorcycles.

EXPLANATION OF THE REFERENCE NUMERALS

9 OUTLET (OF CATALYST CA)
10 MUFFLER MAIN BODY
12 OUTER PLATE
12d PLATE THICKNESS (OF OUTER PLATE)
$12h_1$ THROUGH HOLE
$12h_2$ WELD HOLE
14 EXHAUST GAS DISCHARGING PORT (TAIL PIPE)
17 EXPANSION CHAMBER (UPSTREAM-SIDE EXPANSION CHAMBER)

18f EXPANSION CHAMBER (FRONT DOWNSTREAM-SIDE EXPANSION CHAMBER)
18r EXPANSION CHAMBER (REAR DOWNSTREAM-SIDE EXPANSION CHAMBER)
19 PARTITION WALL (FIRST PARTITION WALL)
20 PARTITION WALL (SECOND PARTITION WALL)
30 CYLINDER-SHAPED REINFORCEMENT MEMBER
30d PLATE THICKNESS (OF CYLINDER-SHAPED REINFORCEMENT MEMBER)
31 FACE-TO-FACE WELD
CA CATALYST
E ENGINE

The invention claimed is:

1. A muffler for an internal combustion engine, said muffler comprising:
    a muffler main body, said muffler main body comprising an outer plate configured in a shape of a cylinder, wherein an inside of the muffler main body comprises a plurality of expansion chambers in communication with each other, said expansion chambers being separated by partition walls attached to an inner peripheral surface of the outer plate;
    a catalyst disposed in an upstream-side expansion chamber, said upstream-side expansion chamber being configured to be connected to a downstream side of an exhaust pipe;
    an exhaust gas discharging port disposed at a downstream end of a downstream-side expansion chamber; and
    a cylinder-shaped reinforcement member attached to the inner peripheral surface of the outer plate, said cylinder-shaped reinforcement member being independent of the partition walls, and disposed inside of the upstream-side expansion chamber.

2. The muffler according to claim 1, wherein a volume of the upstream-side expansion chamber containing the catalyst is larger than a volume of each of a plurality of downstream-side expansion chambers.

3. The muffler according to claim 2, wherein a plane of projection of an outlet of the catalyst in an axial direction intersects a line parallel to a center axis line of the muffler main body, and wherein an outlet of the catalyst is directed to a join portion where a first partition wall defining the upstream-side expansion chamber and the outer plate are joined together.

4. The muffler according to claim 3, wherein the outlet of the catalyst is configured to be directed upward when the muffler is installed on a vehicle, and wherein a face-to-face weld portion of the cylinder-shaped reinforcement member is provided at what is configured to be a side portion of the muffler main body in a left-right direction when the muffler main body is installed on the vehicle.

5. The muffler according to claim 1, wherein the cylinder-shaped outer plate of the muffler main body includes a plurality of through-holes corresponding to attachment points of the cylinder-shaped reinforcement member, and wherein the through-holes are occluded by the cylinder-shaped reinforcement member.

6. The muffler according to claim 1, wherein the cylinder-shaped reinforcement member and the outer plate of the muffler main body comprise a common steel plate, and wherein a plate thickness of the cylinder-shaped reinforcement member is thicker than a plate thickness of the outer plate of the muffler main body.

7. The muffler according to claim 5, wherein the outer plate of the muffler main body includes weld holes therein, and wherein the through-holes in the muffler main body are a same size as the weld holes, and wherein the weld holes are in a location which corresponds to a location of the partition walls.

8. A vehicle comprising a muffler according to claim 1.
9. A vehicle comprising a muffler according to claim 2.
10. A vehicle comprising a muffler according to claim 3.
11. A vehicle comprising a muffler according to claim 4.
12. A vehicle comprising a muffler according to claim 5.
13. A vehicle comprising a muffler according to claim 6.
14. A vehicle comprising a muffler according to claim 7.

15. A muffler for an internal combustion engine, said muffler comprising:
    main body means for forming a main body of the muffler, said main body means comprising an outer portion configured in a shape of a cylinder, wherein an inside of the main body means comprises a plurality of expansion chambers in communication with each other, said expansion chambers being separated by a plurality of partition means for partitioning the inside of the main body means;
    catalyst means for catalyzing exhaust gases, said catalyst means being disposed in an upstream-side expansion chamber, said upstream-side expansion chamber being connected to a downstream side of an exhaust pipe;
    discharging means for discharging exhaust gases, said discharging means disposed at a downstream end of a downstream-side expansion chamber; and
    reinforcement means attached to an inner peripheral surface of the outer portion, said reinforcement means being independent of the partition means, and disposed inside of the upstream-side expansion chamber.

16. A muffler for an internal combustion engine, said muffler comprising:
    main body means for forming a main body of the muffler, said main body means comprising an outer portion configured in a shape of a cylinder, wherein an inside of the main body means comprises a plurality of expansion chambers in communication with each other, said expansion chambers being separated by a plurality of partition means for partitioning the inside of the main body means;
    catalyst means for catalyzing exhaust gases, said catalyst means being disposed in an upstream-side expansion chamber, said upstream-side expansion chamber being connected to a downstream side of an exhaust pipe;
    discharging means for discharging exhaust gases, said discharging means disposed at a downstream end of a downstream-side expansion chamber; and
    reinforcement means attached to an inner peripheral surface of the outer portion, said reinforcement means being independent of the partition means, and disposed inside of the upstream-side expansion chamber,
    wherein a volume of the upstream-side expansion chamber containing the catalyst means is larger than a volume of each of a plurality of downstream-side expansion chambers.

17. The muffler according to claim 16, wherein a plane of projection of an outlet of the catalyst means in an axial direction intersects a line parallel to a center axis of the main body means, and wherein an outlet of the catalyst means is directed to a join portion where a first partition means defining the upstream-side expansion chamber and the outer portion are joined together.

18. The muffler according to claim 17, wherein the outlet of the catalyst means is directed upward when the muffler is installed on a vehicle, and wherein a face-to-face weld portion of the reinforcement means is provided at a side portion of the main body means in a left-right direction when the main body means is installed on the vehicle.

19. A muffler for an internal combustion engine, said muffler comprising:
- main body means for forming a main body of the muffler, said main body means comprising an outer portion configured in a shape of a cylinder, wherein an inside of the main body means comprises a plurality of expansion chambers in communication with each other, said expansion chambers being separated by a plurality of partition means for partitioning the inside of the main body means;
- catalyst means for catalyzing exhaust gases, said catalyst means being disposed in an upstream-side expansion chamber, said upstream-side expansion chamber being connected to a downstream side of an exhaust pipe;
- discharging means for discharging exhaust gases, said discharging means disposed at a downstream end of a downstream-side expansion chamber; and
- reinforcement means attached to an inner peripheral surface of the outer portion, said reinforcement means being independent of the partition means, and disposed inside of the upstream-side expansion chamber, wherein the outer portion of the main body means includes a plurality of through-holes corresponding to attachment points of the reinforcement means, and wherein the through-holes are occluded by the reinforcement means.

20. The muffler according to claim 15, wherein the reinforcement means and the outer portion of the main body means comprise a common steel plate, and wherein a plate thickness of the reinforcement means is thicker than a plate thickness of the outer portion of the main body means.

21. The muffler according to claim 19, wherein the outer portion of the main body means includes weld holes therein, and wherein the through-holes in the main body means are a same size as the weld holes, and wherein the weld holes are in a location which corresponds to a location of the partition means.

* * * * *